Nov. 19, 1957 R. L. McINTIRE ET AL 2,813,699
PEBBLE HEATER APPARATUS
Filed March 9, 1953 2 Sheets-Sheet 1
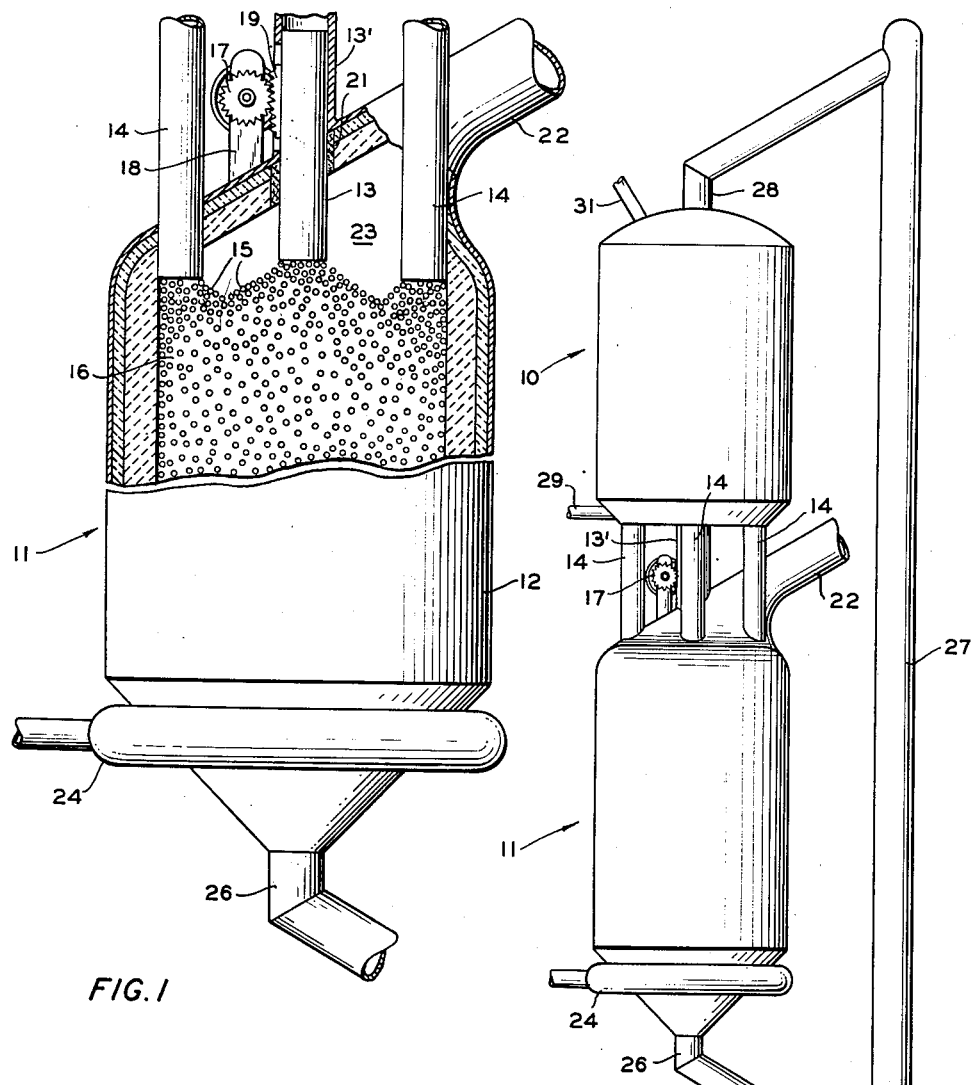
FIG. 1
FIG. 2
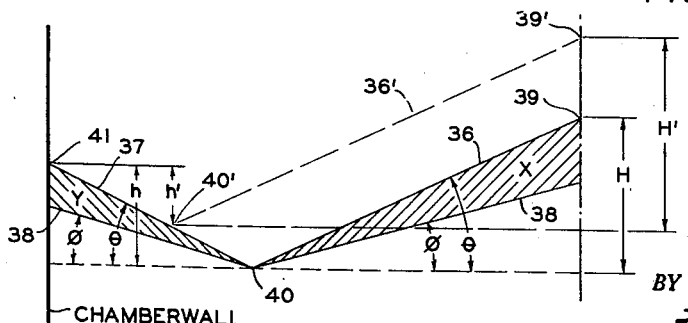
FIG. 3
INVENTORS
R. L. McINTIRE
J. W. BEGLEY
L. C. BEARER
BY Hudson and Young
ATTORNEYS United States Patent Office 2,813,699
Patented Nov. 19, 1957

2,813,699

PEBBLE HEATER APPARATUS

Robert L. McIntire and John W. Begley, Bartlesville, Okla., and Louis C. Bearer, Waco, Tex., assignors to Phillips Petroleum Company, a corporation of Delaware Application March 9, 1953, Serial No. 340,966

13 Claims. (Cl. 257—55)

This invention relates to pebble heaters. In one of its more specific aspects, it relates to an improved reaction chamber of pebble heater apparatus. In another of its more specific aspects, it relates to a means of regulating transverse flow of pebbles across the upper portions of pebble beds in reaction chambers of pebble heaters apparatus. In another of its more specific aspects, it relates to an improved method of operation of reaction chambers of pebble heater apparatus.

Thermal conversion processes which are carried out in so-called pebble heater apparatus utilize a flowing mass of solid heat exchange material. This mass is heated to a high temperature by passing hot gas therethrough in a first direct heat exchange step and is then caused to contact gaseous reactant materials furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a gravitating bed of solid heat exchange material which flows downwardly through the chamber in direct heat exchange with hot gaseous heat exchange material. The solid heat exchange material is heated to a high temperature in the heat exchange and is then gravitated to a second chamber in which the hot solid heat exchange material is caused to contact gaseous reactant material in a second direct heat exchange relation, furnishing heat for the treatment or conversion of the gaseous materials.

Conventional pebble heater chambers of pebble heater apparatus are generally formed as cylinders in which a solid heat exchange material is collected in the form of a gravitating bed. Hot heat exchatnge gases are sometimes introduced into the cylindrical bed at the periphery of its lower end portion, and are sometimes introduced through a refractory arch which supports the moving pebble bed. The solid heat exchange material is drawn from substantially a central point in the bottom of the bed and is passed downwardly into a gas heating chamber where a second moving bed of solid heat exchange material is formed.

Solid heat exchange material which is conventionally used in pebble heater apparatus is generally called "pebbles." The pebbles as used herein are similar to those described in U. S. Patent 2,536,436 issued to Robert R. Goins.

When pebbles are introduced centrally into the upper portion of the conventional pebble heater reaction chamber having a single central pebble inlet, the top of the solid heat exchange material assumes the shape of a cone, extending downwardly and outwardly from the material inlet to the side of the chamber. Pebbles on entering the chamber move across the conical top surface of the pebble bed to points where they begin to move downward in a vertical direction. This type of pebble flow results in a temperature gradient across the pebble bed with concomitant non-uniform cracking of gaseous materials. The maldistribution of gas and pebbles, caused by the transverse flow of pebbles in the conical top of the pebble bed, is one of the principal disadvantages of the single central pebble inlet chamber. By utilizing multiple pebble inlets, located just inside the wall of a chamber, instead of a single pebble inlet it is possible to lower the temperature gradient across the pebble bed, but considerable maldistribution of the gas and pebbles still exists.

The present invention provides a pebbles heater reaction chamber with a single axially-positioned pebble inlet conduit and a plurality of inlet conduits disposed around the periphery of the chamber. In one embodiment of the invention the central pebble inlet is adjustable vertically so that the distance the conduit extends into the reaction chamber can be varied. By this arrangement of conduits, it is possible to vary the height of the top of the central conical portion of the pebble bed above the lowest point in the pebble bed. We have discovered that under specified operating conditions there is an optimum height at which transverse flow of pebbles across the top of the pebble bed is at a minimum. The placement of the central conduit so as to obtain this optimum height results in minimizing the temperature gradient across the pebble bed and a greater overall conversion with less overcracking and undercracking of a hydrocarbon feed than can be obtained with any of the conventional pebble heater apparatus, i. e. with either a single central pebble inlet or a plurality of peripheral pebble inlets, or with any combination of the two not embodying the above-mentioned optimum height feature.

The objects of this invention will be attained by the various aspects of the invention.

An object of this invention is to provide improved pebble heater apparatus.

Another object of this invention is to provide pebble heater apparatus for the conversion of hydrocarbons.

Another object of this invention is to provide an improved method for controlling contact between gaseous materials and hot pebbles in a reaction chamber of pebble heater apparatus.

Another object of the invention is to provide adjustable means for minimizing transverse flow of pebbles across the top of the pebble bed in a pebble heater reaction chamber.

Another object is to lessen the temperature gradient across the pebble bed of a pebble heater reaction chamber.

Another object of the invention is to prevent overcracking and undercracking of hydrocarbon materials in pebble heater apparatus.

Other and further aspects and advantages will be apparent upon study of the accompanying discussion, the drawing and the claims.

For a more complete understanding of the invention, reference may be had to the drawing wherein:

Figure 1 is an elevation partly in section of a pebble heater reaction chamber embodying the invention;

Figure 2 is a schematic view of a pebble heater apparatus embodying the invention;

Figure 3 illustrates graphically a vertical cross section of the upper portion of one-half of the pebble bed of a reaction chamber embodying the invention and shows the relationship between the central and peripheral portions of the pebble bed;

Figure 4:
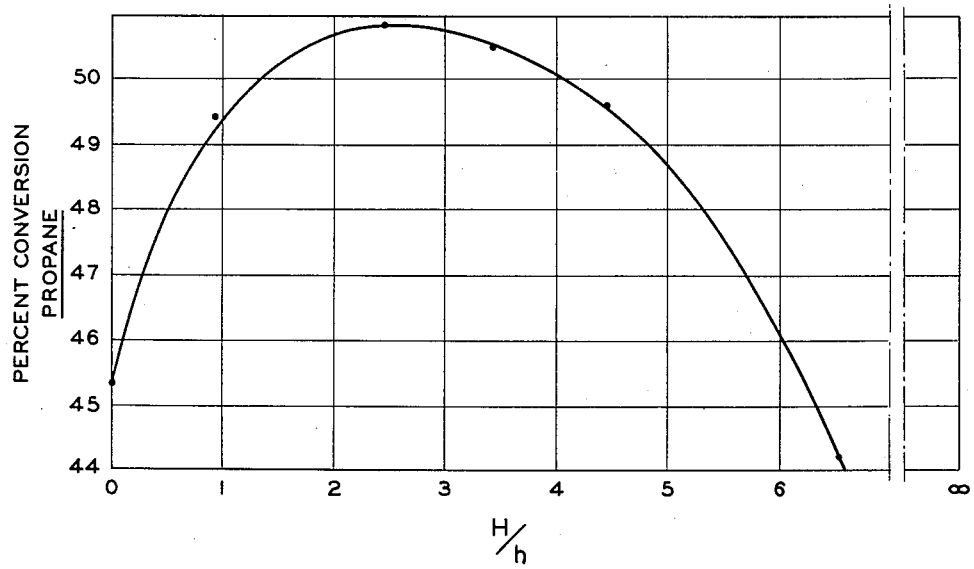
Figure 4 is a graph showing the effect of varying the ratio $H/h$ of Figure 3 upon the percent conversion of propane.

In Figure 1 of the drawing, pebble heater reaction chamber 11 comprises a substantially vertically disposed outer shell 12. The walls of shell 12 are lined with insulating means which may include common refractory material and super refractory material as well as other insulating material. Shell 12 is provided with a pebble inlet 13, which is substantially centrally disposed in the upper end of said shell, and a plurality of pebble inlets 14, which are disposed around the top of said shell at its periphery. Numeral 15 designates the top surface of the pebble bed. Pebble inlets 14 preferably terminate at the upper end of the cylindrical portion of chamber 16 formed within shell 12, and are fixed in position. Pebble inlet 13 extends down into the upper portion of chamber 16, but this inlet can be moved vertically within sleeve 13' through the operation of ratchet wheel 17, attached to stationary member 18, upon rack 19, attached to pebble inlet 13. A sealing means 21 is provided where pebble inlet 13 passes through the upper end of shell 12 to prevent escape of gaseous materials. Effluent outlet conduit 22 is also disposed in the upper end of shell 12. Numeral 23 refers to a gas collecting space above the pebble bed which may be streamlined so as to converge into outlet conduit 22, thus avoiding undue eddy currents and sluggish gas flow which results in uneven heating and also carbon deposition on the walls of the chamber when converting hydrocarbons. Gaseous material inlet means 24 is provided in the lower end of shell 12 and may be in the shape of a header member having a plurality of inlet conduits extending into chamber 16. Pebble outlet 26 is substantially centrally disposed in the lower end of shell 12.

To illustrate pebble heater operation, reference is made in detail to Figure 2 of the drawing in which 10 is an insulated, refractory-lined pebble heating chamber and 11 is the pebble heater reactor chamber illustrated in Figure 1. In Figure 2, identical numerals have been utilized to indicate corresponding parts of Figure 1. The two chambers are positioned one above the other, and are connected by sleeve 13' and pebble inlet 13 and pebble inlets 14, which inlets constitute means for transferring pebbles from pebble heating chamber 10 to reactor chamber 11. Elevator 27 provides means for transferring pebbles from pebble outlet 26 in reactor 11 to pebble inlet 28 in heater 10. Pebbles are heated in heater 10 to a desirable temperature above a predetermined reaction temperature to be maintained in reactor 11 by hot gases introduced through line 29 and taken off through line 31. Hot pebbles descend through sleeve 13', pebble inlet 13 and pebble inlets 14 into reactor 11, forming a slowly descending bed of pebbles therein. A desirable feed gas is admitted to reactor 11 through header member 24, and the gaseous products are withdrawn through gaseous effluent outlet conduit 22.

Pebble heater apparatus is designed to operate continuously, the pebbles being continuously elevated from reactor 11 to heater 10 by elevator 27. When pebbles enter reactor 11 through pebble inlets 13 and 14, they form a contiguous pebble bed with a top surface shaped as indicated at 15 in Figure 1. By adjusting vertically slidable inlet conduit 13, it is possible to control the height of the top central portion of the pebble bed, thus providing a means for minimizing transverse flow of pebbles across the top portion of the pebble bed.

As pointed out hereinabove, pebbles entering the reaction chamber of a pebble heater through a single central inlet follow a flow pattern which results in a temperature gradient across the bed top and consequent non-uniform cracking of hydrocarbons. It has also been pointed out that the same type of temperature gradient exists, although to a lesser extent, in a reaction chamber employing a plurality of peripheral pebble inlets, and that, in accordance with this invention, the use of a combination of the two types of pebble inlets, i. e. a plurality of peripheral inlets and a single central inlet, makes it possible to reduce this temperature gradient still further, provided the relative height of the single central inlet is maintained at or near its optimum value. By so utilizing a single pebble inlet which is vertically adjustable, it is possible under any set of operating conditions to maintain the relative height of this inlet continuously at or near its optimum value, thus ensuring maximum conversion.

In order to illustrate this important aspect of the invention more clearly, reference is made to Figure 3, in which the upper portion of the pebble bed of reaction chamber 16 is shown in one-half cross section. Numeral 36 designates the surface of that portion of the pebble bed formed by the pebbles entering through the central pebble inlet, while numeral 37 indicates the surface formed by pebbles entering through the plurality of peripheral pebble inlets. The lowest point of the valley formed by the two intersecting surfaces 36 and 37 is indicated by numeral 40. Numeral 39 indicates the point at which pebbles leaving the central inlet begin to move toward 40, i. e., 39 indicates the "top" of surface 36, while numeral 41 designates the point at which pebbles leaving the peripheral inlets begin to move toward 40, i. e., 41 represents the "top" of surface 37. It is obvious that some of the pebbles leaving the central inlet will continue to move vertically toward the outlet 26 (Figure 1), and that others must move along surface 36 until they reach point 40, where they then move vertically downward. Still other pebbles travel only a portion of the distance from 39 to 40 before they begin to move downward vertically. In Figure 3 the shaded area X represents the region in which pebbles are moving toward 40, and hence are not moving countercurrently to the ascending gas. Below lines 38 all pebbles are moving vertically. and hence countercurrent to the ascending gas.

Similarly, some of the pebbles entering at 41 move along surface 37 from point 41 to 40, while others travel only a portion of this distance before moving downward vertically. The shaded area Y represents the region of transverse or non-countercurrent flow in this portion of the bed.

Figure 5:
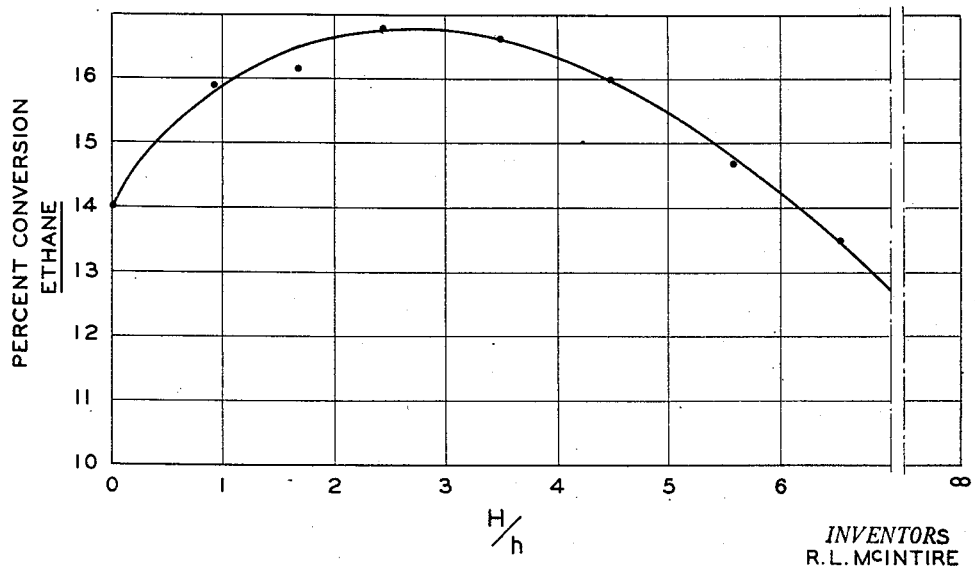
Figure 5 is a graph showing the effect of varying the ratio $H/h$ of Figure 3 upon the percent conversion of ethane.

We have found that non-countercurrent flow is at a minimum when the vertical distance from 40 to 39 (H) is approximately three times the vertical distance from 40 to 41 ($h$). The practical significance of this discovery is shown in Figures 4 and 5, in which are plotted hydrocarbon cracking data for various values of the ratio $H/h$ at the conditions specified in the example hereinbelow. In these figures, the value $H=0$ represents the use of peripheral inlets only, i. e. no central inlet; hence the ratio $H/h$ equals zero. When only a central inlet is used, with no peripheral inlets, $h=0$, and $H/h$ equals infinity. It will be apparent from Figures 4 and 5 that the percent conversion of propane (Figure 4) and of ethane (Figure 5) is greater when only peripheral pebble inlets are used ($H/h=0$) than when only a central inlet is used ($H/h=\infty$). Of more significance is the fact that the conversion in each case is even greater over the range $H/h=0$ to $H/h=6$, approximately. In other words, the addition of a single central pebble inlet to a chamber having a plurality of peripheral inlets results in a marked increase in conversion, whether the ratio $H/h$ is small or large, up to the upper limit of approximately 6. However, we prefer to operate within the range $H/h=1$ to $H/h=4.5$, or $H/h=0.2$ to $H/h=6$, and more desirably in the range $H/h=1.5$ to $H/h=3.5$, to obtain the maximum conversions of hydrocarbons such as ethane and propane.

It should be noted that as the relative heights of points 39 and 41 are changed, for example by raising or lowering central inlet 13 (Figure 1) while inlets 14 remain in a fixed position, the location of point 40 also changes. For any given combination of pebble size, temperature and gas flow rate, the angle $\theta$ formed by surfaces 36 and 37 (Figure 3) with the horizontal will be substantially constant, this angle being approximately 25° for the case considered in the example given. Under other operating conditions, the angle $\theta$ may vary from about 18 to about 30°. The angle $\phi$ also remains substantially constant, its value being about 15° in this example. As the point 39 is moved vertically, therefore, the point 40 moves toward or away from point 41, along the surface 37. Thus, if inlet 13 is raised to the position 39′ surface 36 moves to the position 36′ and point 40 moves to position 40′. The vertical distances H and $h$ are then represented by H′ and $h'$.

While the invention may be practiced using only a small number of peripheral pebble inlets 14, say 2 or 3, we prefer to employ at least 4, and better results are obtained if more than this number are used. It is preferred that inlets 14 be located closely adjacent the inner wall of chamber 16, rather than spaced inwardly therefrom.

The following illustrative example will demonstrate the advantages of the invention as discussed in the specification.

For this example, a feed of the following composition in mol percent is utilized: Methane=20.9, ethane=55.6, and propane=23.5. The ethane and propane are cracked for the production of ethylene. The pebbles at a temperature of 1598° F. enter a reaction chamber with a pebble bed approximately six feet in depth, and the rate of pebble flow through the reactor is 41,000 pounds per hour.

When a single, centrally located pebble inlet is employed, the average overall conversions are 10.8 and 37.7 percent for the ethane and propane, respectively. When only multiple inlets, disposed around the periphery of the chamber, are used, the average conversions are 14.0 and 45.3 percent for the ethane and propane, respectively. As shown in the following table and in the graphs illustrated in Figures 4 and 5, a maximum conversion occurs by utilizing the combination of both types of pebble introduction and by positioning the central inlet conduit at the optimum height as discussed above in the specification.

*Effect of pebble inlet positions on hydrocarbon conversion*

| Relative Heights of Central and Peripheral Inlets $H/h$ | Resultant Conversions, Mol Percent | |
|---|---|---|
| | Propane | Ethane |
| 0 [1] | 45.3 | 14.0 |
| .93 | 49.4 | 15.9 |
| 1.65 | 50.2 | 16.1 |
| 2.48 | 50.8 | 16.7 |
| 3.45 | 50.5 | 16.6 |
| 4.45 | 49.6 | 16.0 |
| 6.55 | 44.2 | 13.5 |
| ∞ [2] | 37.7 | 10.8 |

[1] No central inlet—all pebbles in through peripheral inlets.
[2] No peripheral inlets—all pebbles in trough single central inlet.

As will be evident to those skilled in the art, various modifications of this invention can be made or followed in the light of the foregoing disclosure and discussion without departing from the spirit or scope of the disclosure or from the scope of the claims.

We claim:

1. In pebble heater apparatus utilizing a moving bed of heated pebbles, an improved pebble heater reaction chamber comprising in combination an upright elongated closed shell; a vertically adjustable pebble inlet centrally positioned in the top of said shell; a plurality of pebble inlets disposed around the periphery of the top of said shell adjacent the inside wall of said chamber and extending to approximately the same level in the upper section of said chamber; a gaseous effluent outlet in the top of said shell; a gaseous material inlet in the lower portion of said shell; and a pebble outlet in the bottom of said shell.

2. In pebble heater apparatus utilizing a moving bed of heated pebbles, an improved pebble heater reaction chamber comprising in combination an upright elongated closed shell; a pebble inlet centrally positioned in the top of said shell, said inlet extending downwardly into the chamber formed within said shell and being vertically adjustable therein; a plurality of pebble inlets extending thru the top of said shell adjacent the inside wall of said chamber to approximately the same level; gaseous effluent outlet means in the top of said shell; gaseous material inlet means in the lower portion of said shell; and a pebble outlet in the bottom of said shell.

3. In pebble heater apparatus utilizing a moving bed of heated pebbles, an improved pebble heater reaction chamber comprising in combination an upright elongated closed shell; a pebble inlet conduit centrally positioned in the top of said shell, said inlet conduit extending downwardly into the chamber formed within said shell and being vertically adjustable therein; a plurality of pebble inlet conduits disposed around the periphery of the top of said shell and terminating within said chamber, said peripheral pebble inlets extending into said chamber to approximately the same level and said central pebble inlet being adjustable upwardly from the level of said peripheral pebble inlets; gaseous effluent outlet means in the top of said shell; gaseous material inlet means in the lower portion of said shell; and a pebble outlet in the bottom of said shell.

4. In pebble heater apparatus utilizing a moving bed of heated pebbles, an improved pebble heater reaction chamber comprising in combination an upright elongated closed shell having a top closure member; an axial pebble inlet conduit extending thru said closure member into said chamber; a plurality of pebble inlet conduits extending thru said closure member at the inner periphery of said shell and terminating at about the level of its upper end, the inlet conduits being so disposed that the ratio of the height of the downstream end of the centrally positioned pebble inlet conduit above the lowest point on the surface of said moving bed of heated pebbles to the height of the downstream ends of the plurality of pebble inlet conduits above same said lowest point is greater than 0 but not greater than 6; gaseous effluent outlet means in said closure member; gaseous material inlet means in the lower portion of said shell; and a pebble outlet in the bottom of said shell.

5. In pebble heater apparatus utilizing a moving bed of heated pebbles, an improved pebble heater reaction chamber comprising in combination an upright closed outer shell; insulating means within and adapted so as to insulate said shell; an axial pebble inlet conduit in the top of said shell extending downwardly into the upper portion of the chamber formed within said shell, said means being slidably adjustable vertically to regulate the length of said means extending into said chamber; means for adjusting the distance said pebble inlet means extends into said chamber; a plurality of fixed peripheral pebble inlet conduits extending downwardly into the upper portion of said chamber to approximately the same level; means in the upper portion of said shell for withdrawing gas; gas inlet means in the lower portion of said shell; and pebble outlet means in the bottom of said shell.

6. The improved pebble heater reaction chamber of claim 5 wherein the means for vertically adjusting the centrally positioned pebble inlet means comprises a rack attached to said pebble inlet means and a ratchet wheel attached to a stationary upright member positioned on the top of said shell, said rack and said ratchet wheel being operatively engaged.

7. An improved method of operating a pebble heater reaction chamber of pebble heater apparatus which comprises the steps of admitting heated pebbles axially and peripherally into the upper portion of a reaction zone; passing said pebbles downwardly as a continguous pebble bed through said reaction zone; passing a gaseous feed stock upwardly through said pebble bed; maintaining the ratio of the height of the top of the central portion of said pebble bed above the lowest point on the surface of said pebble bed to the height of the top of the peripheral portion of said pebble bed above said lowest point so as to minimize the noncountercurrent flow of said pebbles across the top of said pebble bed; removing pebbles from the lower portion of said pebble bed; and removing gaseous reaction products from the upper portion of said reaction zone.

8. An improved method of operating a pebble heater reaction chamber of pebble heater apparatus which comprises the steps of introducing heated pebbles in a single stream into the axial portion and in a plurality of streams peripherally into the upper part of a reaction chamber so that the resulting pebble bed is higher adjacent the wall of said chamber and at the axis than at intermediate points; passing said pebbles downwardly as a contiguous pebble bed through said reaction zone; maintaining the ratio of the height of the top of the conical central portion of said pebble bed above the lowest point on the surface of said pebble bed to the height of the top of the peripheral portion of said pebble bed above said lowest point so that transverse movement of pebbles in the top of said pebble bed is reduced to a minimum; passing a gaseous feed stock upwardly through said pebble bed; removing pebbles from the lower portion of said pebble bed; and removing gaseous reaction products from the upper portion of said reaction zone.

9. The method of claim 8 wherein the ratio of the height of the top of said central portion of said pebble bed above the lowest point on the surface of said pebble bed to the height of the top of the peripheral portion of said pebble bed above said lowest point is maintained at approximately 3:1.

10. The method of claim 8 wherein the ratio of the height of the top of said central portion of said pebble bed above the lowest point on the surface of said pebble bed to the height of the peripheral portion of said pebble bed above same said lowest point is maintained in the range of 1.5:1 to 3.5:1.

11. The method of claim 8 wherein the ratio of the height of the top of said central portion of said pebble bed above the lowest point on the surface of said pebble bed to the height of the peripheral portion of said pebble bed above same said lowest point is maintained in the range of 0.2:1 to 6:1.

12. In pebble heater apparatus utilizing a moving bed of heated pebbles, an improved pebble heater reaction chamber comprising in combination an upright elongated closed cylindrical shell having a top closure member the inner surface of which forms a streamlined exit for gases; an axial pebble inlet extending through said closure member into an upper section of said chamber; a plurality of pebble inlets uniformly disposed around the periphery of said chamber adjacent said shell, their lower ends terminating at the level of the juncture of said shell with said closure member; a gaseous material inlet in the lower portion of said shell; and a pebble outlet in the bottom of said shell.

13. The apparatus of claim 12 wherein said inlets are disposed so that the ratio of the height of the downstream end of the axially positioned pebble inlet above the lowest point on the surface of said moving bed of heated pebbles to the height of the downstream ends of the plurality of pebble inlets above same said lowest point is greater than 0 but not greater than 6.

References Cited in the file of this patent

UNITED STATES PATENTS

| | | |
|---|---|---|
| 2,101,490 | Bullock et al. | Dec. 7, 1937 |
| 2,441,335 | Sinclair | May 11, 1948 |
| 2,446,986 | Simpson | Aug. 10, 1948 |
| 2,451,924 | Crowley | Oct. 19, 1948 |
| 2,530,274 | Weber | Nov. 14, 1950 |
| 2,636,805 | Lassiat et al. | Apr. 28, 1953 |